United States Patent [19]

Koyanagi et al.

[11] Patent Number: 5,671,971
[45] Date of Patent: Sep. 30, 1997

[54] APPARATUS FOR ADJUSTING FASTENING POSITION OF FASTENING MEANS IN SEAT BELT DEVICE

[75] Inventors: Toshiro Koyanagi; Yayoi Hashimoto, both of Hikone; Haruyuki Takagi, Tokyo, all of Japan

[73] Assignee: Takata Corporation, Tokyo, Japan

[21] Appl. No.: 375,467

[22] Filed: Jan. 19, 1995

Related U.S. Application Data

[63] Continuation of Ser. No. 981,201, Nov. 25, 1992, abandoned.

[30] Foreign Application Priority Data

Dec. 5, 1991 [JP] Japan ................................ 3-322098

[51] Int. Cl.⁶ .......................... A47C 1/08; A47C 13/00
[52] U.S. Cl. ...................... 297/250.1; 297/468; 297/485
[58] Field of Search ........................ 297/250, 468, 297/482, 485, 250.1, 188.11, 144, 145, 188.01; 24/68 F, 68.5 B, 200, 198, 197

[56] References Cited

U.S. PATENT DOCUMENTS

| | | | |
|---|---|---|---|
| 2,278,153 | 3/1942 | Shaulson | 24/200 |
| 2,565,629 | 8/1951 | Reinberger | 24/200 |
| 3,203,058 | 8/1965 | Roing | 24/68 F |
| 3,222,745 | 12/1965 | Palmleaf et al. | 24/68 F |
| 3,547,489 | 12/1970 | Grieser | 297/468 |
| 3,606,453 | 9/1971 | Cicero | 297/468 |
| 4,482,187 | 11/1984 | Nagashima et al. | 297/485 |
| 4,685,740 | 8/1987 | Föhl | 297/468 |
| 4,925,245 | 5/1990 | Pendleton et al. | 297/188.1 |
| 5,098,157 | 3/1992 | Surot | 297/250.1 |
| 5,108,152 | 4/1992 | Reilly et al. | 297/484 |
| 5,228,746 | 7/1993 | Burleigh | 297/485 |

FOREIGN PATENT DOCUMENTS

| | | | |
|---|---|---|---|
| 808616 | 9/1958 | Germany | 297/144 |
| 1965111 | 9/1970 | Germany | 297/144 |
| 2917469 | 11/1980 | Germany | 297/468 |

*Primary Examiner*—Bibhu Mohanty
*Attorney, Agent, or Firm*—Armstrong, Westerman, Hattori, McLeland & Naughton

[57] ABSTRACT

An apparatus for adjusting the fastening position of fastening means in a seat belt device includes a seat-portion body (7) provided with a belt guide (120) and a retaining spring (119). Ordinarily, the belt guide (120) is set in a non-use position at which the belt guide is engaged and retained by the retaining spring (119). When in use, the belt guide (120) is detached from the retaining spring (119), projected to the left and turned to insert projecting portions (120c), (120d) thereof into respective grooves (23), (24). As a result, the belt guide (120) assumes a state in which the guide portion (120a) is projected outwardly of the seat portion. When the guide portion (120a) is made to guide the vehicle seat belt (131), the portion at which a tongue (123) and buckle (124) are fastened together is offset from the corner of the protective seat (1), as a result of which the engagement between the tongue (123) and buckle (124) of the seat belt (131) is made more reliable.

5 Claims, 20 Drawing Sheets

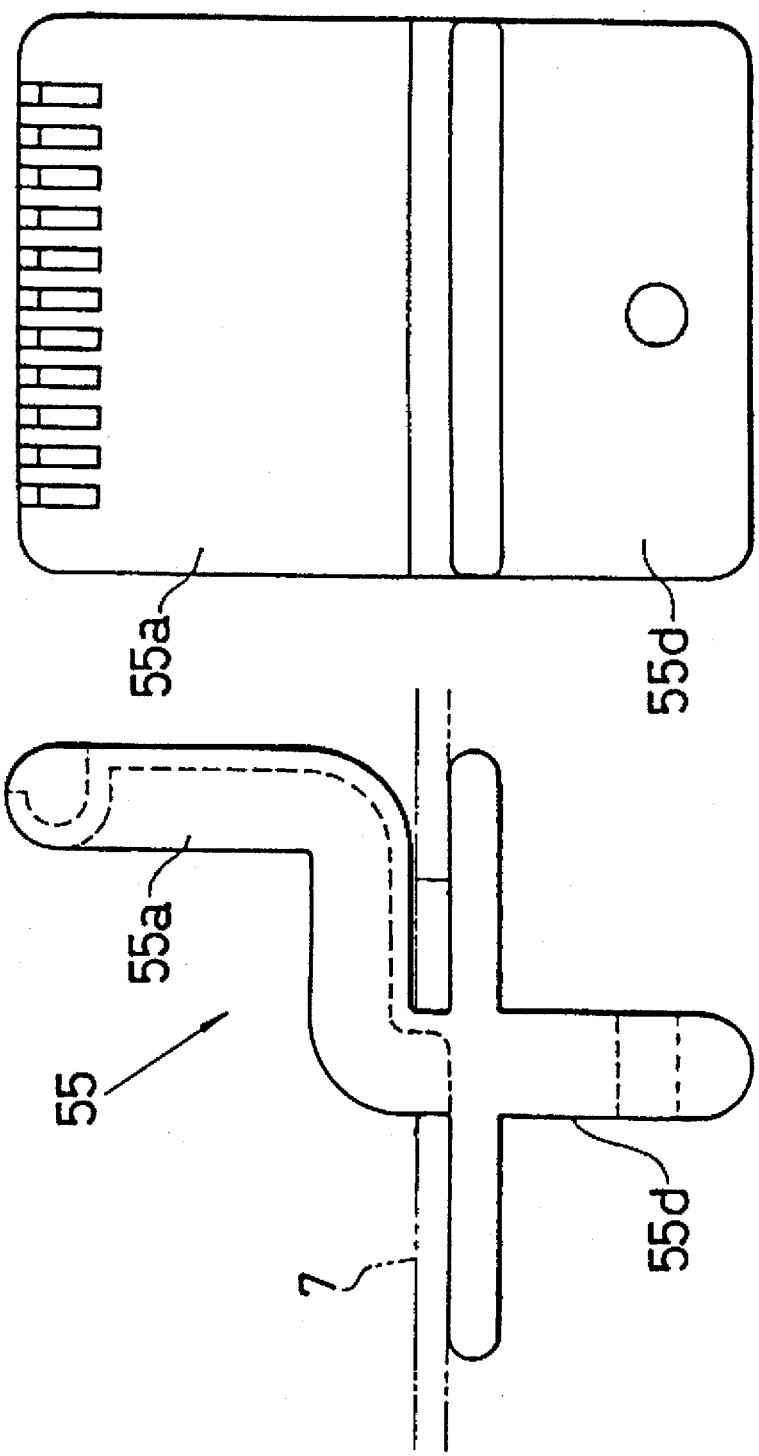

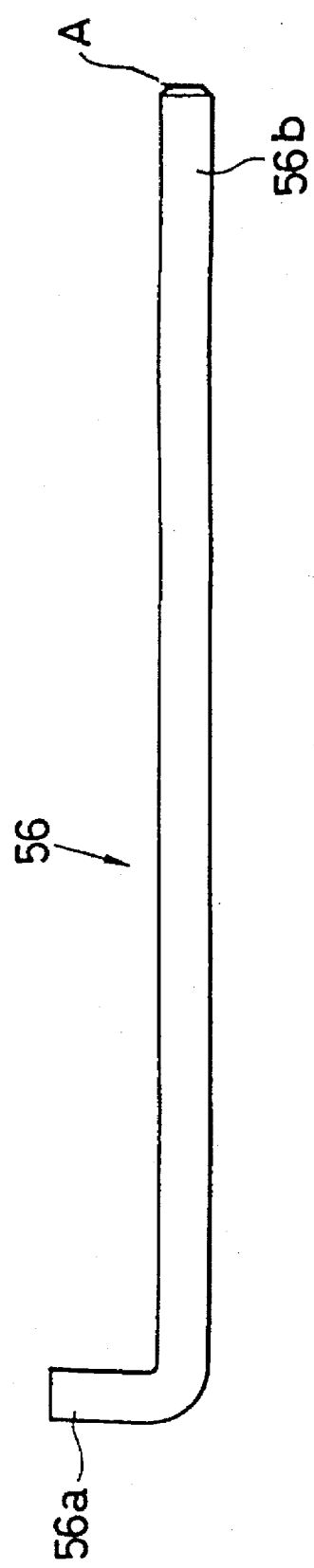

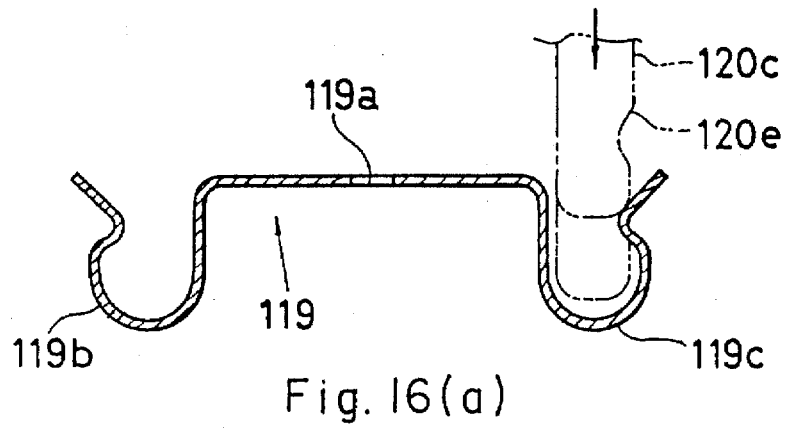
Fig. 16(a)
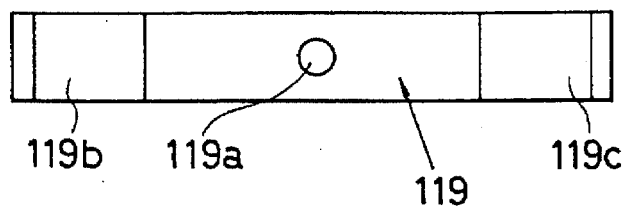
Fig. 16(b)
Fig. 17
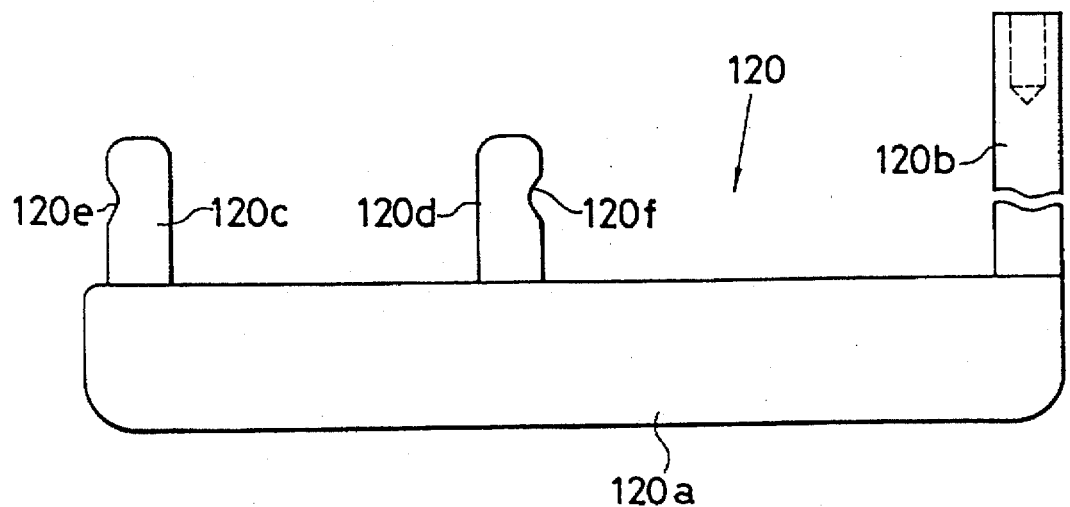

1

APPARATUS FOR ADJUSTING FASTENING POSITION OF FASTENING MEANS IN SEAT BELT DEVICE

This application is a continuation of application Ser. No. 07/981,201 filed Nov. 25, 1992, now abandoned.

BACKGROUND OF THE INVENTION

1. Field of the Invention

This invention relates to a seat belt device installed in the seat of a vehicle and having at least a seat belt and fastening means such as a tongue and buckle, for restraining and protecting a passenger seated in the seat, wherein the seat belt device is capable of securing an infant-restraining protective seat for restraining and protecting an infant. More particularly, the invention relates to an apparatus for adjusting the fastening position of the fastening means in the seat belt device.

2. Description of the Related Art

In a vehicle such as an automobile or airplane, restraining protective seats for infants have been used in order to maintain the seated posture of an infant during travel and to protect the infant from shock at the time of acceleration and deceleration. An infant restraining and protective seat of this kind has a reclinable seat main body reclinably attached to a base member and adapted to seat an infant, and an infant seat belt device for restraining the seated infant. The infant seat belt device has an infant seat belt, a chest-contact pad attached to the end of the infant seat belt, a tongue provided on the end of the chest-contact pad, and a buckle, provided on the seat main body, capable of holding the tongue in such a manner that the tongue can be freely engaged with and disengaged from the buckle. In a state in which the tongue is engaged with and locked by the buckle, the infant is restrained by the infant seat belt and chest-contact pad.

In a vehicle seat to which the infant-restraining protective seat is secured, the lateral width of the vehicle seat differs depending upon the type of vehicle, such as an automobile or airplane. Even if the vehicle is of the same type, the lateral width of the vehicle seat differs depending upon the model and size of the vehicle. When the lateral width of the vehicle seat differs in this manner, the following problem arises with regard to fixing the infant-restraining protective seat to the vehicle seat: Specifically, in a case where the width of a vehicle seat 122 is large in comparison with the width of an infant-restraining protective seat 1, there will be instances in which the portion where a tongue 123 of the vehicle seat belt device and a buckle 124 thereof engage happens to be situated at the corner of the protective seat 1 when the tongue and buckle are fastened together, as shown in (a) of FIG. 19, after the protective seat 1 has been secured to the vehicle seat. When the tongue 123 and buckle 124 are joined in such a state, the connection between the two is unstable.

SUMMARY OF THE INVENTION

An object of the present invention is to provide an apparatus for adjusting the fastening position of fastening means in a seat belt device, wherein an infant-restraining protective seat is capable of being secured reliably to a vehicle seat in a stable state even if the width of the protective seat differs greatly from that of the vehicle seat.

According to the present invention in a first aspect thereof, the foregoing object is attained by providing an apparatus for adjusting a fastening position of fastening means in a seat belt device, which is installed in a seat of a vehicle and has at least a seat belt and fastening means such as a tongue and buckle, for restraining and protecting a passenger seated in the seat, wherein the seat belt device is capable of securing an infant-restraining protective seat for retraining and protecting an infant, characterized in that the apparatus adjusts the fastening position of the fastening means when the fastening means is fastened in order to secure the infant-restraining protective seat to the vehicle seat.

In a second aspect of the invention, the invention is characterized in that the apparatus comprises at least a belt guide for guiding the seat belt in a lateral direction.

In a third aspect of the invention, the apparatus is characterized in that the belt guide is provided on the infant-restraining protective seat.

In a fourth aspect of the invention, the apparatus is characterized in that the belt guide is set at non-use and in-use positions.

In a fifth aspect of the invention, the apparatus is characterized in that the belt guide is provided so as to be movable laterally and so as to be tiltable with respect to the infant-restraining protective seat.

In a sixth aspect of the invention, the apparatus is characterized in that the belt guide is provided so as to be movable laterally with respect to the infant-restraining protective seat.

In a seventh aspect of the invention, the apparatus is characterized in that the belt guide comprises two blocks each in the shape of a rectangular parallelepiped, the blocks being pivotally connected.

In the apparatus for adjusting the fastening position of the fastening means in the seat belt device according to the invention constructed as set forth above, the seat belt is guided in at least the lateral direction or has its length shortened. As a result, the fastening position of the fastening means of the seat belt device is moved to the left or right. Accordingly, when the fastening means is fastened in order to secure the infant-restraining protective seat to the seat of the vehicle, the fastening means assumes a position offset from the corner of the protective seat. This makes it possible to secure the protective seat to the vehicle seat stably and reliably even if the widths of the protective seat and vehicle seat differ greatly from each other.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

BRIEF DESCRIPTION OF THE DRAWINGS

FIG. 9 illustrates an operating lever of a seat-back tilting control device in this example, in which (a) is a side view thereof and (b) a front view;

FIG. 10 is a view showing a locking pin in this example;

FIG. 16 illustrates the retaining spring of this embodiment, in which (a) is a front view thereof and (b) a plan view;

FIG. 17 is a view showing the belt guide of this embodiment;

DESCRIPTION OF THE PREFERRED EMBODIMENTS

An embodiment of the present invention will now be described with reference to the drawings.

Figure 1:
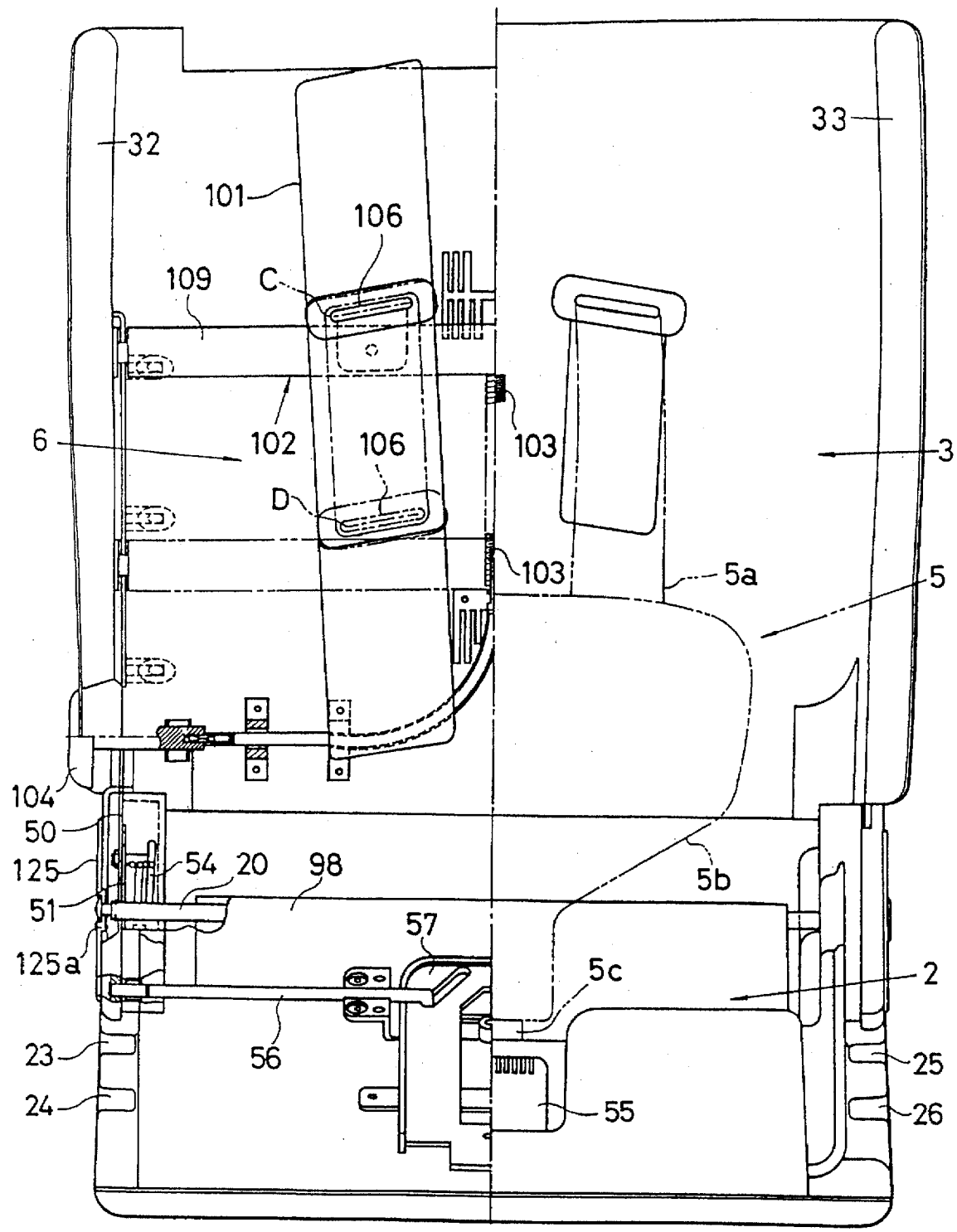
FIG. 1 is a front view showing an example of an infant-restraining protective seat, in which the left half of the seat has been cut away, provided with an embodiment of an apparatus for adjusting the fastening position of fastening means in a seat belt device according to the present invention.
Figure 2:
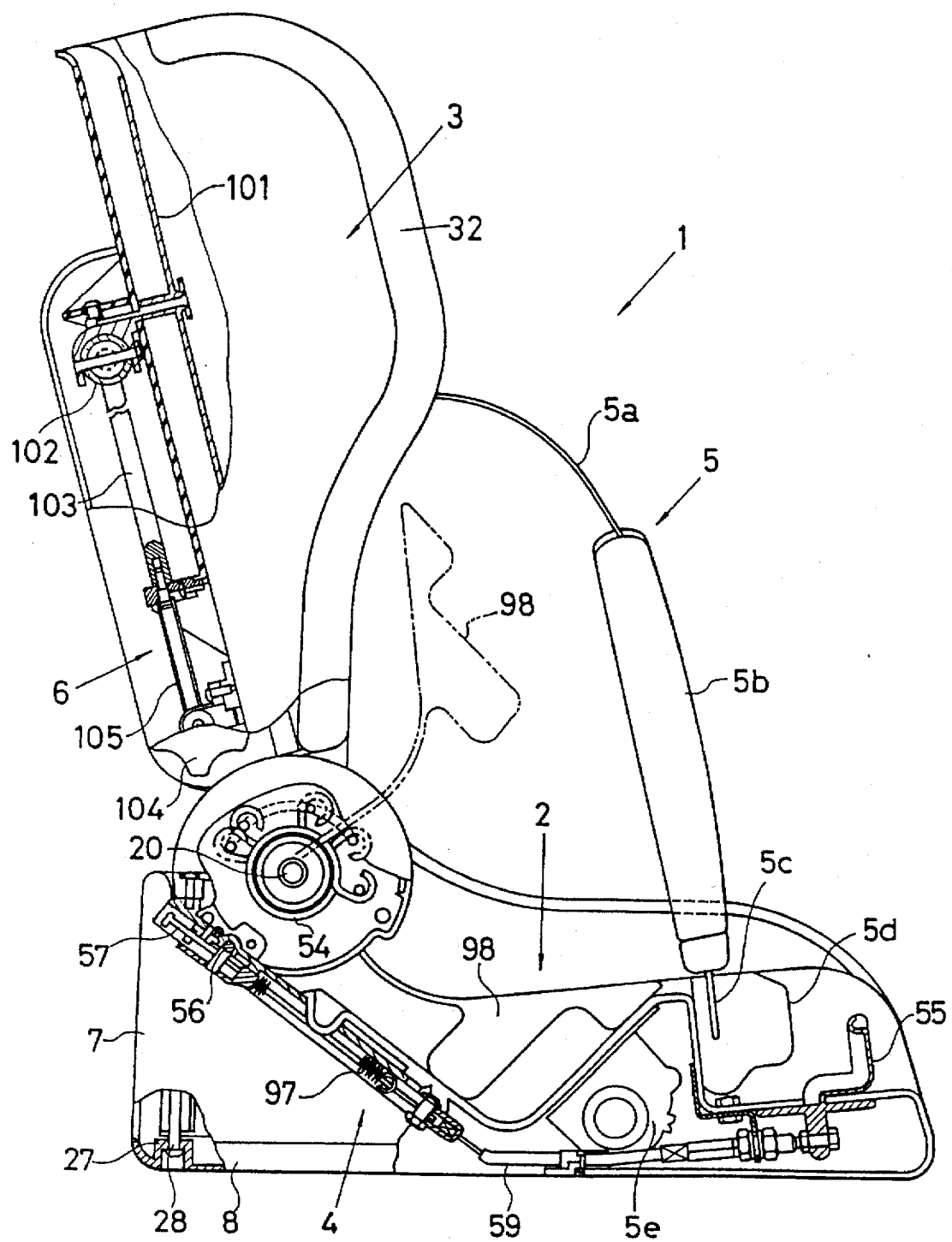
FIG. 2 is a side view showing this example of the infant-protective seat with a portion thereof cut away.

As illustrated in FIGS. 1 and 2, an infant-restraining protective seat 1 according to the embodiment of this invention includes a seat portion 2 for seating an infant, a seat back 3 tiltably attached to the seat portion 2 for supporting the back of the infant, a seat-back tilting control device 4 for controlling tilting of the seat back 3, an infant seat belt device 5 for restraining the infant seated on the seat portion 2, and a shoulder-belt adjusting device 6 for adjusting the up-and-down position of a shoulder belt 5a in the infant seat belt device 5.

Figure 3:
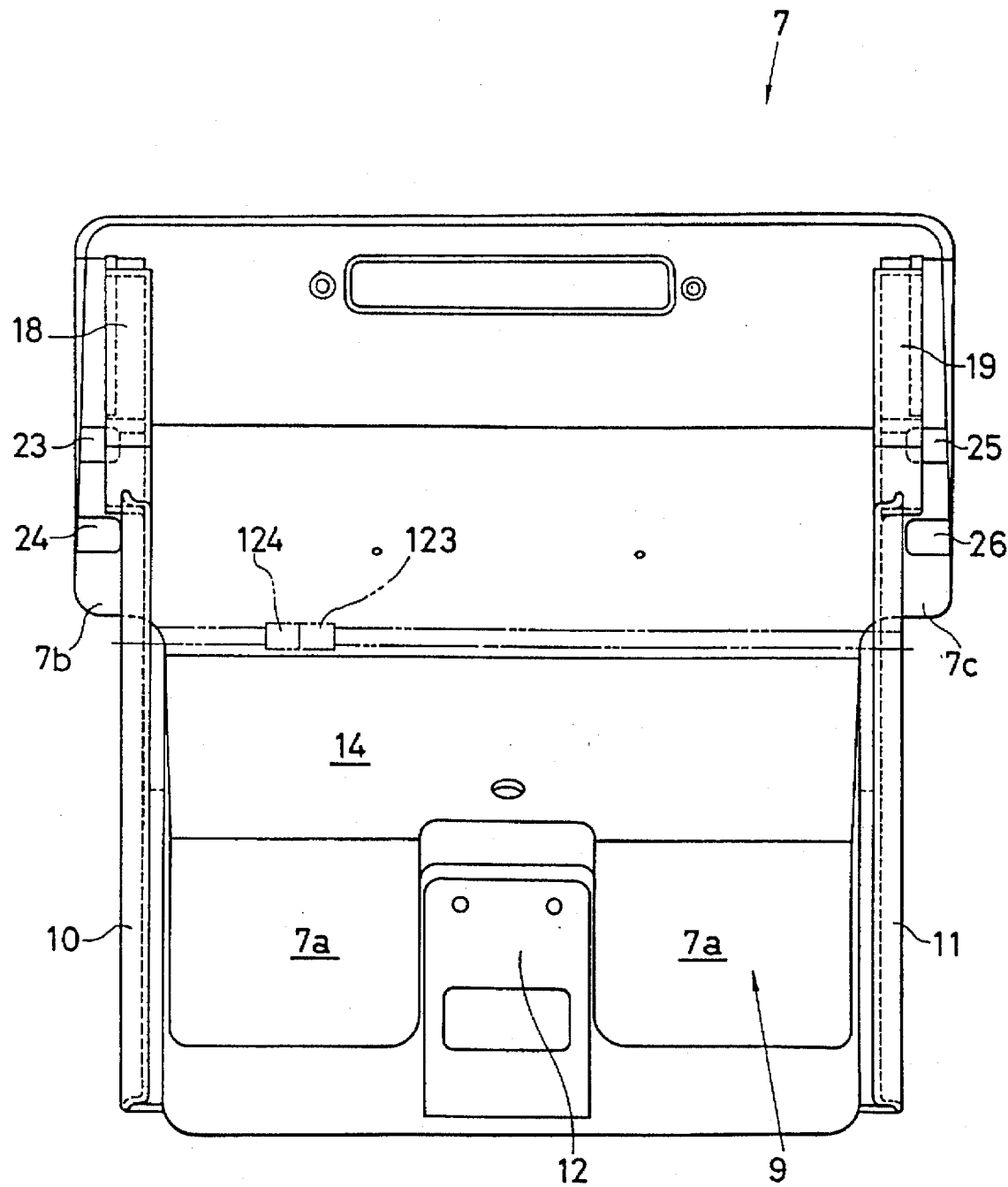
FIG. 3 is a plan view showing the main body of a seat portion in this example.
Figure 4:
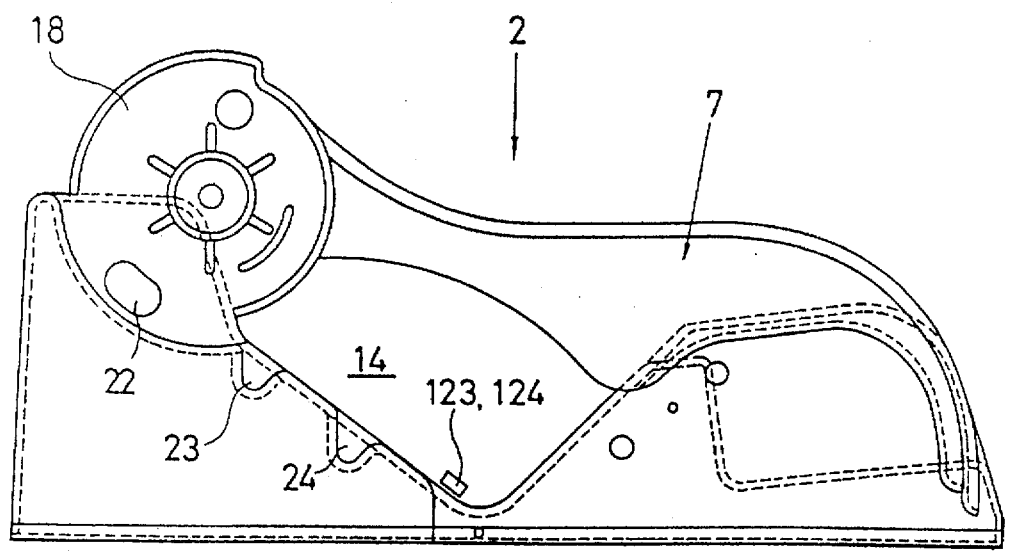
FIG. 4 is a side view showing the main body of the seat portion in this example.

The seat portion 2 comprises a seat-portion body 7 and a base portion 8 supporting the seat-portion body 7. As illustrated in FIGS. 3 and 4, the seat-portion body 7 is constituted by a central portion 9 which directly seats the infant, and left and right side walls 10, 11 formed respectively on the left and right sides of the central portion 9. These components are formed as a unitary body consisting of a plastic shell. Formed in the forward part of the central portion 9 is a first recess 12 for accommodating a buckle 5d of the infant seat belt device 5, described later, and an operating lever 55 of the seat-back tilting control device 4, also described later.

Formed across the middle of the central portion 9 in terms of the longitudinal direction thereof is a second recess 14 having a V-shaped cross section. The arrangement is such that a tongue 123 and buckle 124 of a passenger-restraining seat belt device installed at a vehicle seat 122 of a vehicle such as an automobile or airplane and used also for securing the infant-restraining protective seat 1 to the vehicle seat are situated within the second recess 14.

The rear portions of the left and right side walls 10, 11 are formed to have respective turning support portions 18, 19, of substantially circular shape, at which turning portions of the control device 4 are supported. The turning support portions 18, 19 are provided at their centers with a turning-shaft through-hole 21 through which a turning shaft 20 for rotatably supporting the seat back 3 is passed, and at their rearward lower portions with a locking-pin through-hole 22 through which a locking pin 56 (the details of which will be described later) of the control device 4, which pin is for locking the seat back 3 at a set predetermined angular position, is passed.

The outer sides of the left and right side walls 10, 11 are formed to have pairs of grooves 23, 24; 25, 26; respectively, having upwardly open substantially V-shaped cross sections. These grooves are situated at positions corresponding to the second recess 14. In a case where the lateral width of the protective seat 1 for infants is considerably smaller than the width of the vehicle seat to which the protective seat 1 is secured, a pair of projecting portions 120c, 120d of a belt guide 120 (shown in FIG. 17) which guides a seat belt 121 installed at the vehicle seat are supported by these grooves 23, 24, 25, 26 when the belt guide is used.

Figure 5:
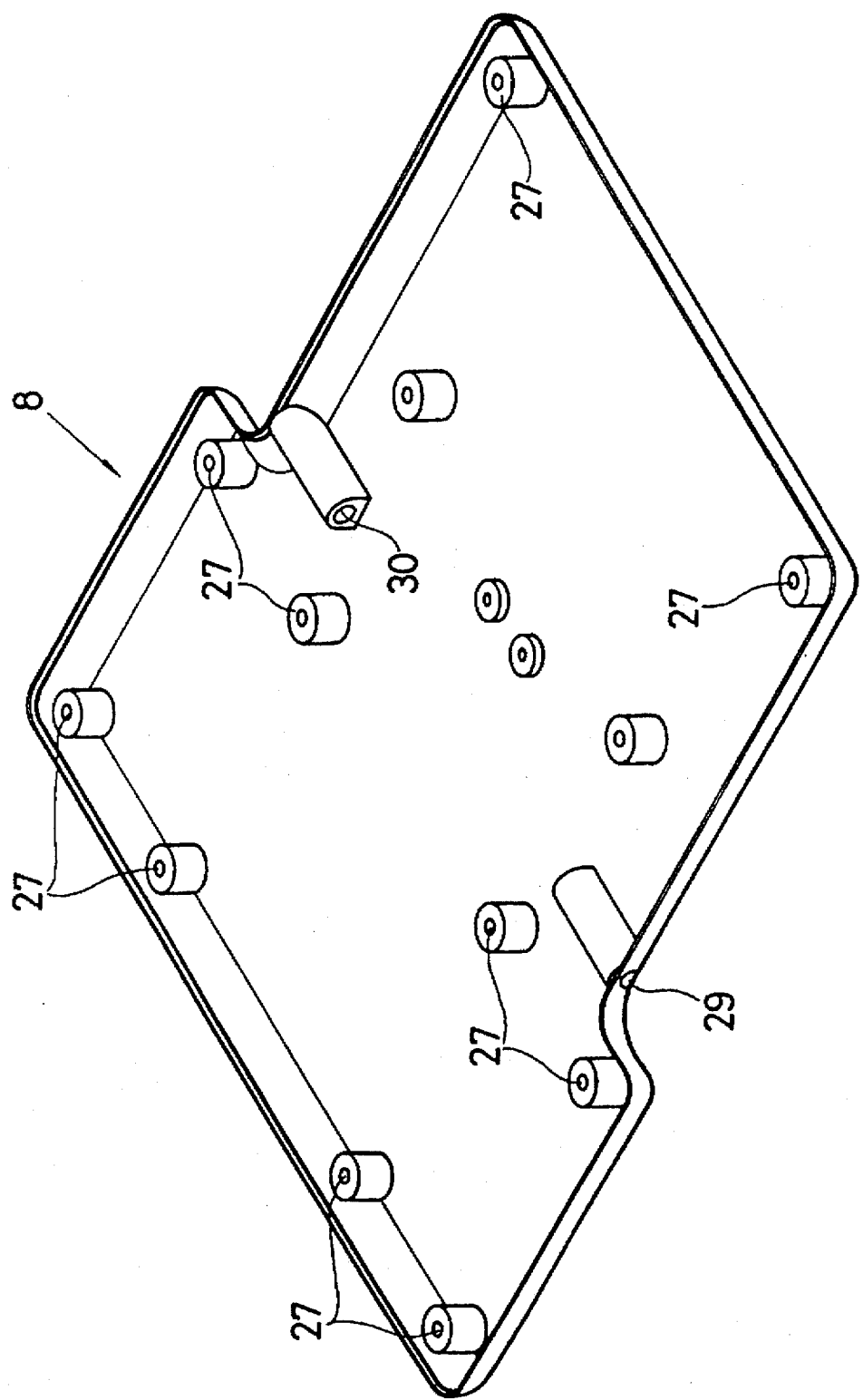
FIG. 5 is a perspective view showing a base portion in this embodiment.

As illustrated in FIG. 5, the base portion 8 also is formed of a plastic shell and is formed to have a prescribed number of mounting holes 27 into which screws for attaching the seat-portion body are tightly screwed. As shown in FIG. 2, the seat-portion body 7 is attached to a mounting portion 27 on the base portion 8 by means of screws 28. The left and right sides of the base portion 8 are provided with a pair of respective belt-guide through-holes 29, 30 through which a turning shaft 120b of the aforesaid belt guide is passed so as to be capable of turning.

Figure 6:
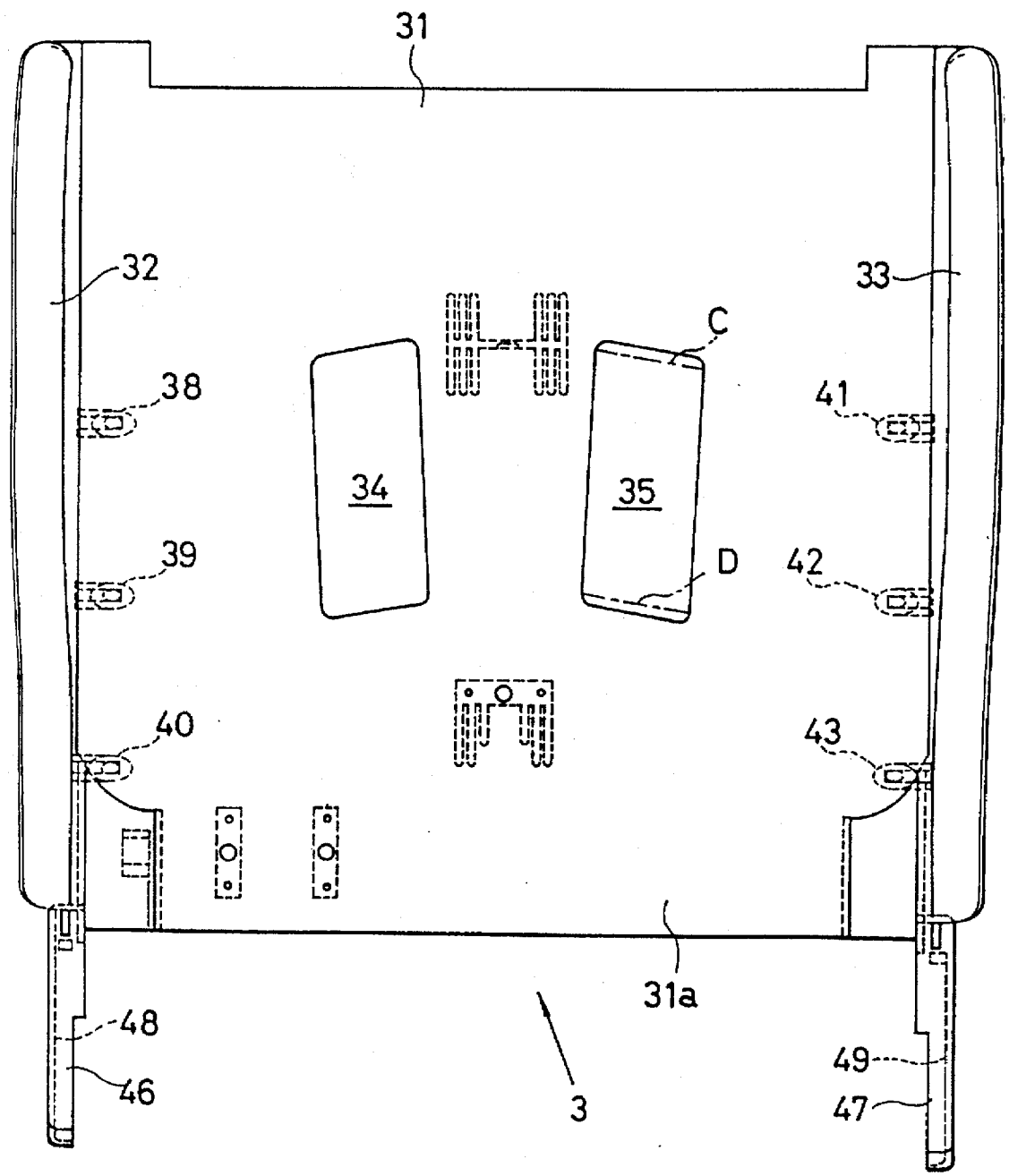
FIG. 6 is a front view showing a seat back in this example.

As shown in FIG. 6, the seat back 3 is constituted by a seat back portion 31 which directly supports the back of the seated infant, and left and right side walls 32, 33 provided respectively on the right and left sides of the seat back portion 31. These also consist of a plastic shell. The central portion of the seat back 31 is provided with a pair of vertically extending guide holes 34, 35 each having the shape of parallelogram. A belt guide 101 in the shoulder-belt adjusting device 6 is passed through each of the guide holes 34, 35. The arrangement is such that the belt guide 101 may be moved up and down while being guided in the guide holes 34, 35.

The left and right side walls 32 and 33 at portions near the seat back portion 31 are provided respectively with mounting portions 38, 39, 40 and 41, 42, 43 into which screws for attaching an upper bracket 50 (shown in FIG. 7) of the seat-back tilting control device 4 are tightly screwed.

The lower ends of the left and right side walls 32, 33 are formed to have respective turning support portions 46, 47, of substantially circular shape, in which turning portions of the seat-back control device 4 are accommodated and supported. The turning support portions 46, 47 are centrally provided with respective through-holes 48, 49 into each of which a projecting portion 125a on the central portion of a rotating shaft cover 125 (shown in FIG. 1), described later, is inserted.

As illustrated in FIGS. 1 and 2, the seat-back tilting control device 4 includes left and right upper brackets 50 attached respectively to the left and right side walls 32, 33 of the seat back 3, left and right lower brackets 51 attached respectively to the left and right side walls 10, 11 of the seat-portion body 7, a torsion spring 54 interposed between an upper hook pin 52 attached to the upper bracket 50 and a lower hook pin 53 attached to the lower bracket 51, an operating lever 55, the locking pin 56, a cam plate 57 for controlling movement of the locking pin 56 between a locking position and an unlocking position, a case 58 for slidably accommodating and supporting the locking pin 56 and the cam plate 57, a biasing spring 97 for constantly biasing the cam plate 57 in such a direction that the locking pin 56 assumes the locking position, and an operating-force transmitting link 59 connected between the operating lever 55 and the cam plate 57 for transmitting the operating force of the operating lever 55 to the cam plate 57 against the biasing force of the biasing spring 97.

Figures 7A, 7B:
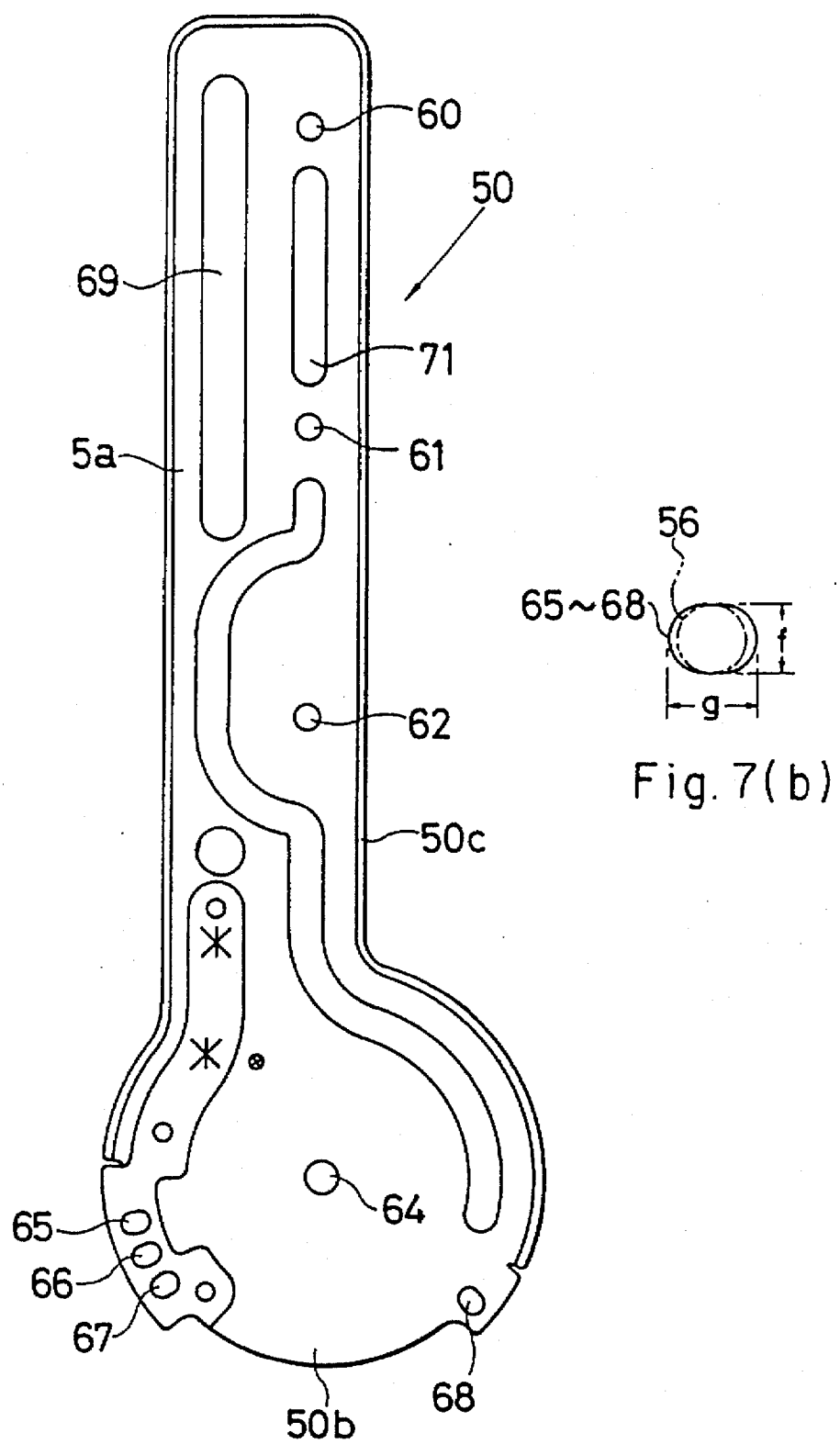
FIG. 7 illustrates an upper bracket in this example, in which (a) is a plan view thereof and (b) an enlarged view of a locking hole.

As illustrated in FIG. 7, the upper bracket 50 has the shape of a flat plate and is constituted by an upper rectangular portion 50a and a lower circular portion 50b. The rectangular portion 50a is provided with three vertically aligned screw holes 60, 61, 62 through which screws for attaching the upper bracket 50 to the seat back are passed.

The circular portion 50b is provided with a hole 64 through which the turning shaft 20 is passed so as to be capable of turning relative the circular portion. Further, in order that the seat back 3 may be locked at any of three reclining angles, three locking holes 65, 66, 67 through which the locking pin 56 is passed are formed in the circular portion 50b on the circumference of a circle of a prescribed radius from the center of the hole 64. In order to lock the seat back 3 at the folded position, the circular portion 50b is provided with a locking hole 68, located on the same circumference as the locking holes 65, 66, 67, through which the locking pin 56 is passed. As shown in (b) of FIG. 7, each of the locking holes 65, 66, 67, 68 is elliptical in form, with the ellipse having a minor axis f and a major axis g. In this case, the minor axis f is set to have a size that allows the locking pin 56 to be passed through and slid along the hole with almost no gap between the pin 56 and the walls of the hole. Further, the locking holes 65, 66, 67, 68 are so arranged that the minor axis f of each hole lies in the circumferential direction of a circle concentric with the hole 64 while the major axis g of each hole lies in the diametric direction of the circle concentric with the hole 64. The circular portion 50 is further provided with a longitudinally extending guide slot 69. A guide 113 of supporting means 102 is guided up and down by the guide slot 69.

As illustrated in FIG. 1, the upper bracket 50 is secured to the seat back 3 by passing screws through the screw holes 60, 61, 62 and screwing them into the mounting holes 38, 39, 40 of the seat back 3.

Figure 8A:
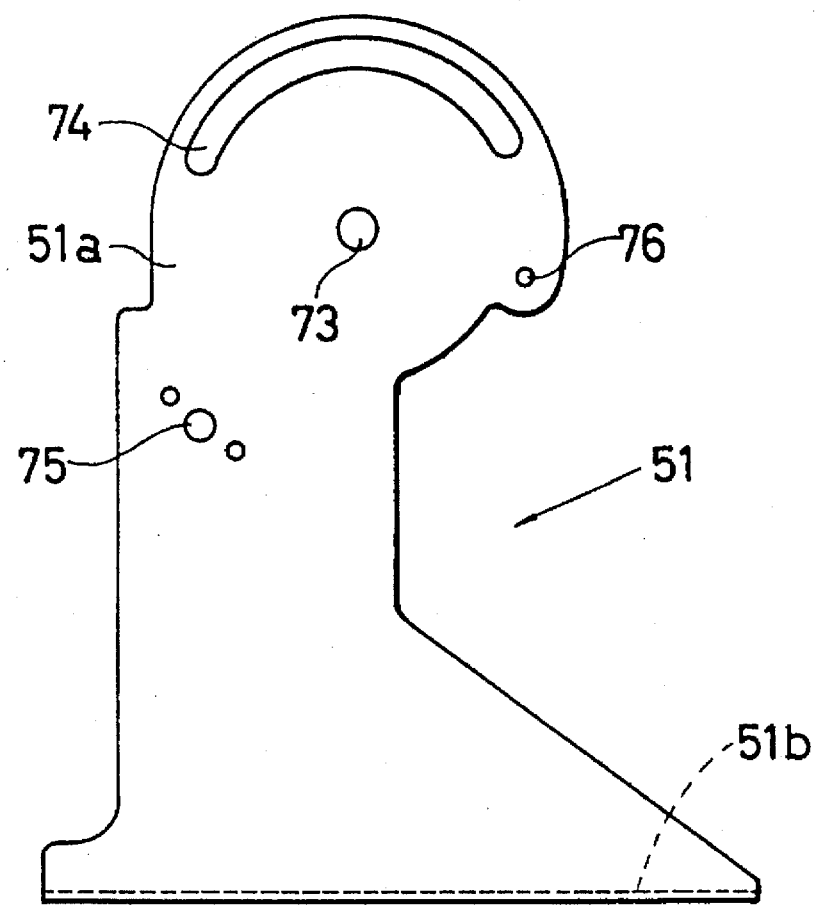
FIG. 8 illustrates a lower bracket in this example, in which (a) is a front view thereof and (b) a plan view.
Figure 8B:
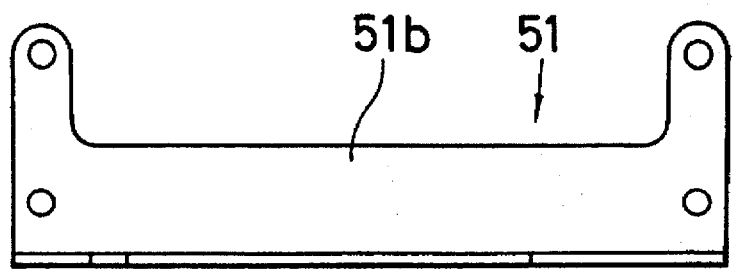

As shown in (a) and (b) of FIG. 8, the lower bracket 51 is formed to have a semicircular portion 51a on its upper part, while its lower part is formed to have a mounting portion 51b fastened to the seat-portion body 7 by screws. The semicircular portion 51a has a centrally provided circular hole 73 through which the turning shaft 20 is passed. The semicircular portion 51a is further provided with a guide slot 74 along an arc concentric with the hole 73. The upper hook pin 52 is passed through the guide slot 74 and is turnably guided thereby when the seat back 3 is tilted. The lower bracket 51 includes also a hole 75 through which the locking pin 56 is slidably passed. In this case, the through-hole 75 is provided at such a position that the length of a line between the center of the hole 75 and the center of the hole 73 will be equal to the radius of the circle, which is centered on the hole 64, on which the locking holes 65, 66, 67 of upper bracket 50 are provided. The upper bracket 50 is secured to the seat-portion body 7 by screws (not shown).

As illustrated in FIG. 1, the turning shaft 20 is passed through the hole 73 of the lower bracket 51, which is secured to the seat-portion body 7, and is supported on the lower bracket 51, and the upper bracket 50 secured to the seat back 3 is situated on the outer side of the lower bracket 51 and is tiltably supported by passing the turning shaft 20 through the hole 64. In this case, the upper bracket 50 is prevented from falling off the turning shaft 20 by a retaining ring 77. A cover 78 of the turning shaft 20 is attached so as to cover the turning shaft 20 by fitting a projection 78a of the cover 78 into the through-hole 48 of the seat back 3 and screwing a screw into the end portion of the turning shaft 20. The upper hook pin 52 secured to the upper bracket 50 is passed through the guide slot 74 so as to extend to inner side of the lower bracket 51 and is situated between the turning support portions 18, 19 of the seat-portion body 7.

In addition, the torsion spring 54 is interposed between the upper hook pin 52 and the lower hook pin 53 secured to the lower bracket 51. Thus, the seat back 3 is attached to the seat-portion body 7 so as to be capable of tilting about the turning shaft 20. In this case, one of the locking holes 65, 66, 67, 68 of the upper bracket 50 registers with the through-hole 75 of the lower bracket 51 depending upon the angular position to which the seat back 3 has been tilted.

As shown in FIG. 9, the operating lever 55 includes an operating portion 55a arranged in the recess 12 of the seat-portion body 17 for actuating the operating lever 55, and a connection portion 55d to which the operating-force transmitting link 59 is connected.

Figure 19A:
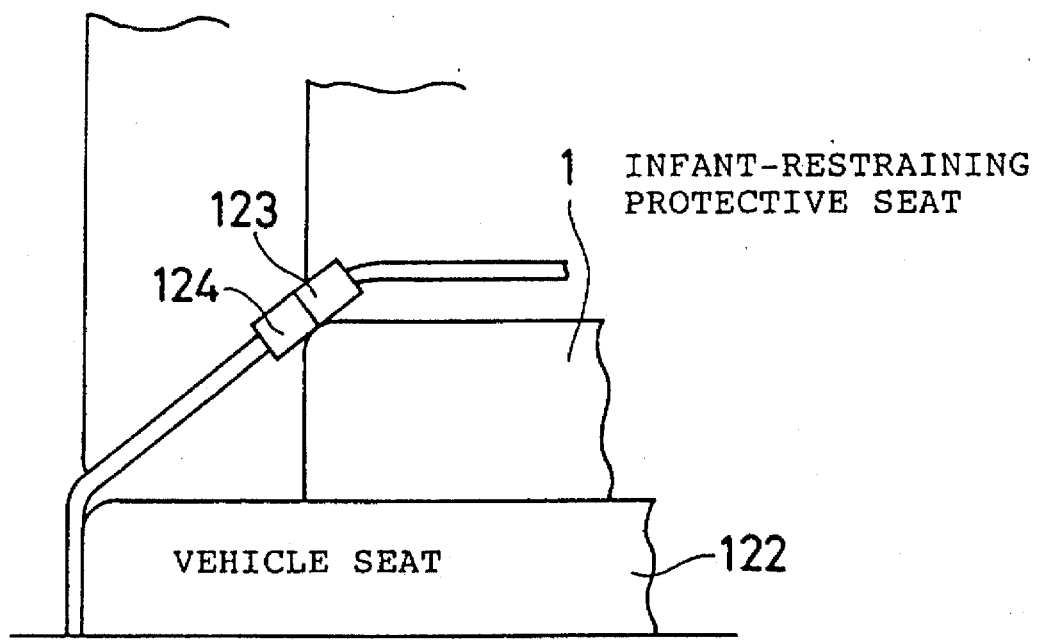
FIG. 19 is for describing the belt guide, in which (a) is an explanatory view for a case where there is no belt guide and (b) an explanatory view for a case where there is a belt guide.
Figure 19B:
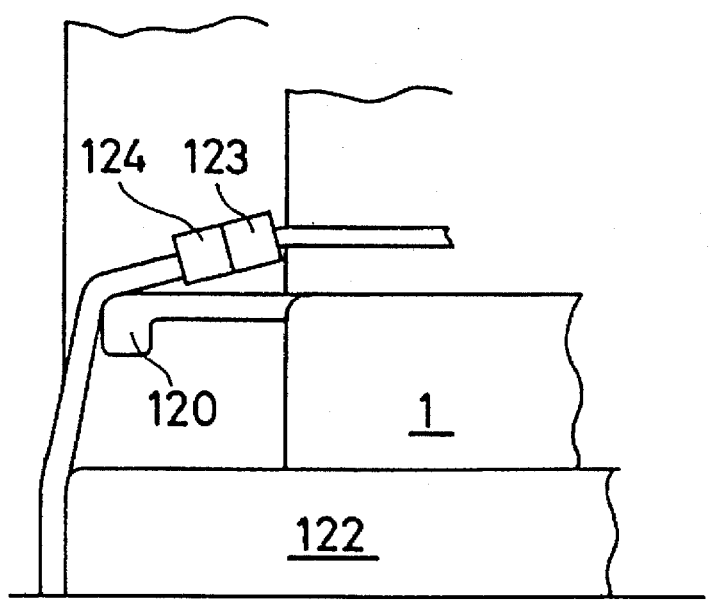

As shown in FIG. 10, the locking pin 56 is formed from a round bar, one end of which is formed to have a cam follower 56a bent at a right angle. The cam follower 56a is fitted into cam slots 80, 81 (shown in FIG. 19) of the cam plate 57 and is moved by movement of the cam plate 57 while being guided by the cam slots 80, 81. The other end of the locking pin 56 is formed to have a locking portion 56b. Owing to movement of the locking pin 56 while it is being guided by the cam slots 80, 81, the locking portion 56b is passed through one of the locking holes 65, 66, 67, 68 of the upper bracket 50 and the through-hole 75 of the lower bracket 51 so as to lock the upper bracket 50 and the lower bracket 51. In this case, the other end of the locking pin 51 is provided with a chamfer A. The locking portion 56b is passed through the locking holes 65, 66, 67, 68 and the through-hole 75 more easily by virtue of the chamfer A.

Figure 11A:
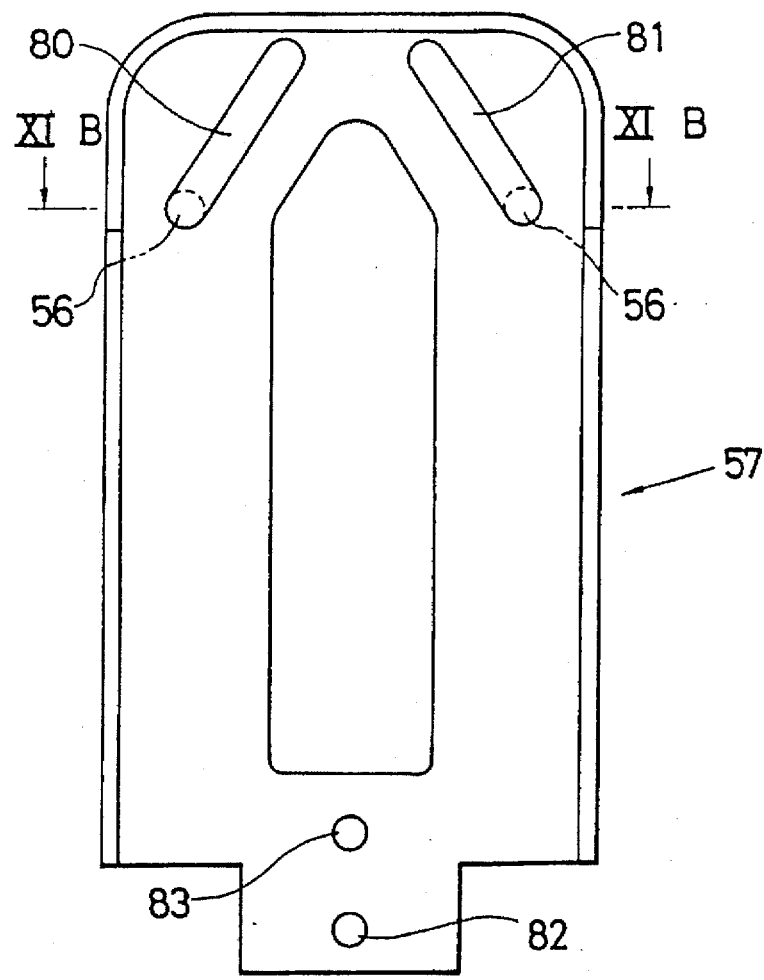
FIG. 11 illustrates a cam plate of the seat-back tilting control device in this example, in which (a) is a plan view thereof and (b) a sectional view taken along line XIXB—XIXB.
Figure 11B:
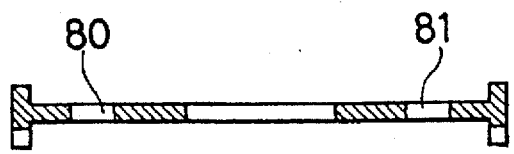

As illustrated in FIG. 11, the cam plate 57 is formed substantially as a flat plate. In cam plate 57 as it appears in FIG. 11, the upper edge is formed to have the pair of cam slots 80, 81, which diverge from each other from the top down, into which the cam follower 56a of the locking pin 56 is inserted. The lower edge of the cam plate 57 is provided with a hole 82 to which one end of the operating-force transmitting link 59 is connected, and with a hole 83 to which one end of the biasing spring 97 (shown in FIG. 2), which biases the cam plate 57 upward at all times as seen in FIG. 11, is connected.

As illustrated in FIG. 2, the operating-force transmitting link 59 has one end thereof connected to the hole 55e of the connecting portion 55d of operating lever 55. The other end of the link 59 is connected to the hole 82 of the cam plate 57.

Figure 12:
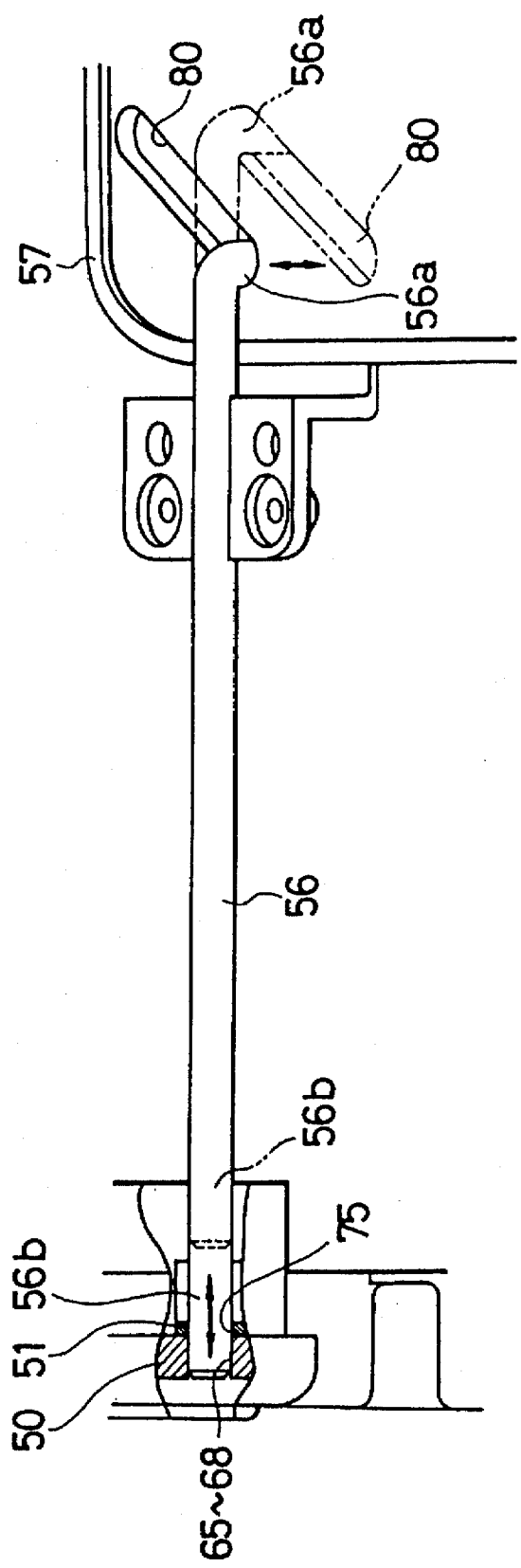
FIG. 12 is a view for describing the operation of the locking pin and cam plate in the seat-back tilting control device of this example.

In the seat-back tilting control device 4 thus constructed, the cam follower 56a of the locking pin 56 ordinarily is set at the lowermost end of the cam slots 80, 81 by the biasing spring 97, as described above, and the locking pin 56 is projecting to the maximum degree. With the locking pin 56 in this state, as shown in FIG. 12, the locking portion 56b is fitted into any one of the locking holes 65, 66, 67, 68 and the through-hole 75. The locking pin 56 therefore is in the locking position. As a result, the seat back 3 is set at a prescribed reclining angle or in the folded position. When the cam plate 57 is moved downward in FIG. 12 by pulling the operating lever 5 forward, the cam follower 56a is guided by the cam slot 80, and therefore the locking pin 56 moves to the right. When the cam follower 56a is situated at the uppermost end of the cam slot 80, as indicated by the phantom lines, the locking portion 56b exits completely from one of the locking holes 65, 66, 67, 68 and from the through-hole 75, whereby the locking pin 56 assumes the unlocking position. As a result, the seat back 3 is free to tilt.

The infant seat belt device 5 includes left and right shoulder belts 5a, a chest-contact pad 5b connected to the shoulder belts 5a, a tongue 5c attached to the lower end of the chest-contact pad 5b, the buckle 5d with which the tongue 5c locks, and a retractor 5e for taking up a webbing, which unites the left and right shoulder belts 5a into a single body, through the back of the seat back 3. The infant seat belt device 5 is substantially identical with that of the prior art.

As depicted in FIGS. 1 and 2, a cover seat 98 is supported on the turning shaft 20, which tiltably supports the seat back 3 relative to the seat portion 2, so as to be capable of tilting between the position indicated by the solid line and the position indicated by the phantom line in FIG. 2, the cover seat 98 being situated between the left and right lower brackets 51. The cover seat 98 is formed in such a manner that when it is at the position indicated by the solid line in FIG. 2, it will cover the second recess of the seat-portion body 7 and cooperate with the seat surface 7a at the forward part of the seat-portion body 7 and a seat-back surface 31a of the seat back portion 31, which constitutes the seat back 3, to render continuous the seat surface of the protective seat 1 and the surface of the seat back. As a result, the infant can be seated safely and reliably.

Figure 13:
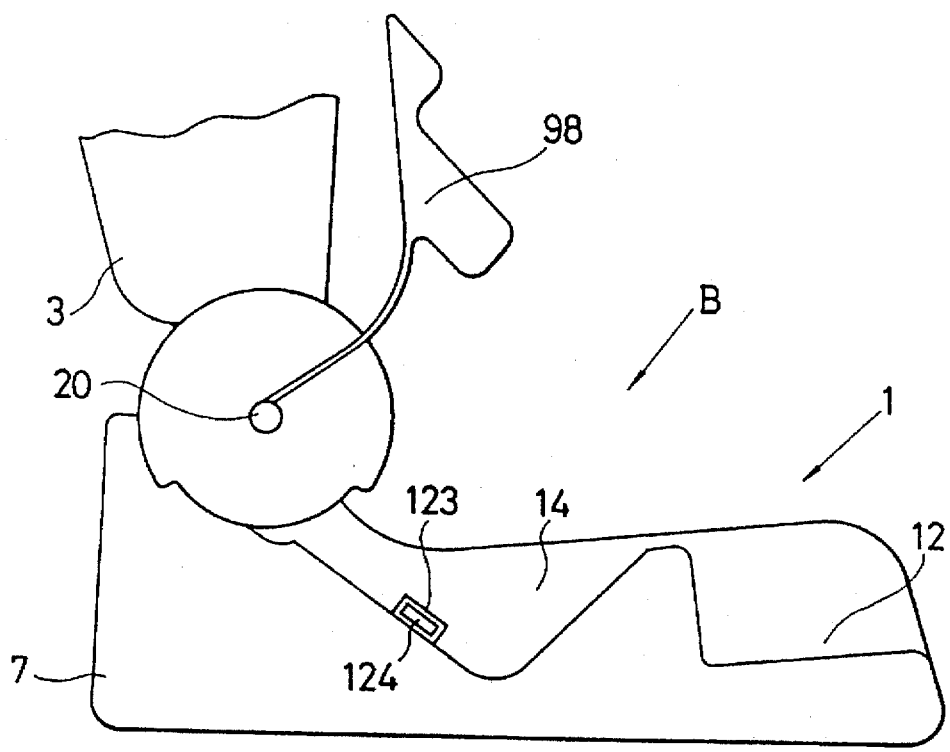
FIG. 13 is a view for describing the action of a cover seat.

When the cover seat 98 is at the position indicated by the phantom line in FIG. 2, on the other hand, it opens the second recess 14 of the seat-portion body 7. As result, when the protective seat 1 is attached to and detached from a vehicle seat, as shown in FIG. 13, the operation for fastening and unfastening of the tongue 123 and buckle 124 of the seat belt device, which is installed at the vehicle seat and situated in the second recess 14, can be performed easily from above the front of the protective seat 1 (i.e., from the direction of arrow B).

As illustrated in FIGS. 1 and 2, the shoulder-belt adjusting device 6 includes the belt guide 101 for guiding the shoulder belts of the infant seat belt in such a manner that the position of the shoulder belts can be adjusted up or down, the supporting means 102 for supporting the belt guide 101, the vertically extending screw shaft 103 for moving the supporting means 102 up and down, the operating knob 104 turnably attached to one of the left and right side walls 32, 33 (the left side wall 33 in the example illustrated) of the seat back 3, and the torque link 105 which connects the operating knob 104 and the screw shaft 103 while producing a right-angle change in direction, and which transmits the rotational torque of the operating knob 104 to the screw shaft 103. The belt guide 101 is capable of being moved up and down in such a manner that the hole 106 through which the belt is passed is moved up and down between an upper-limit position C and a lower-limit position D.

When the operating knob 104 is turned in the shoulder-belt adjusting device 6 thus constructed, the rotational torque is transmitted to the screw shaft 103 via the torque link 105, whereby the screw shaft 103 is turned. Turning the screw shaft 103 in one direction lowers the belt guide 101, whereas turning the screw shaft 103 in the other direction raises the belt guide 101. Thus, the position of the shoulder belts of the infant seat belt device can be continuously adjusted up and down.

Figure 14:
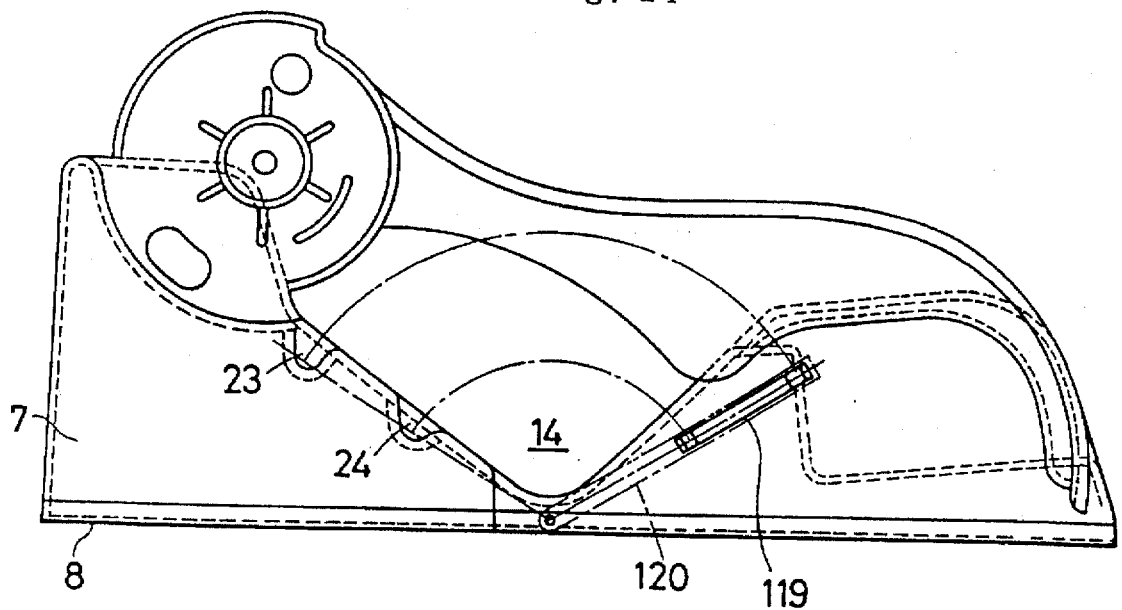
FIG. 14 is a view showing the set position of a belt guide as well as the mounting position of a retaining spring for retaining the belt guide in an embodiment of the present invention.
Figure 15:
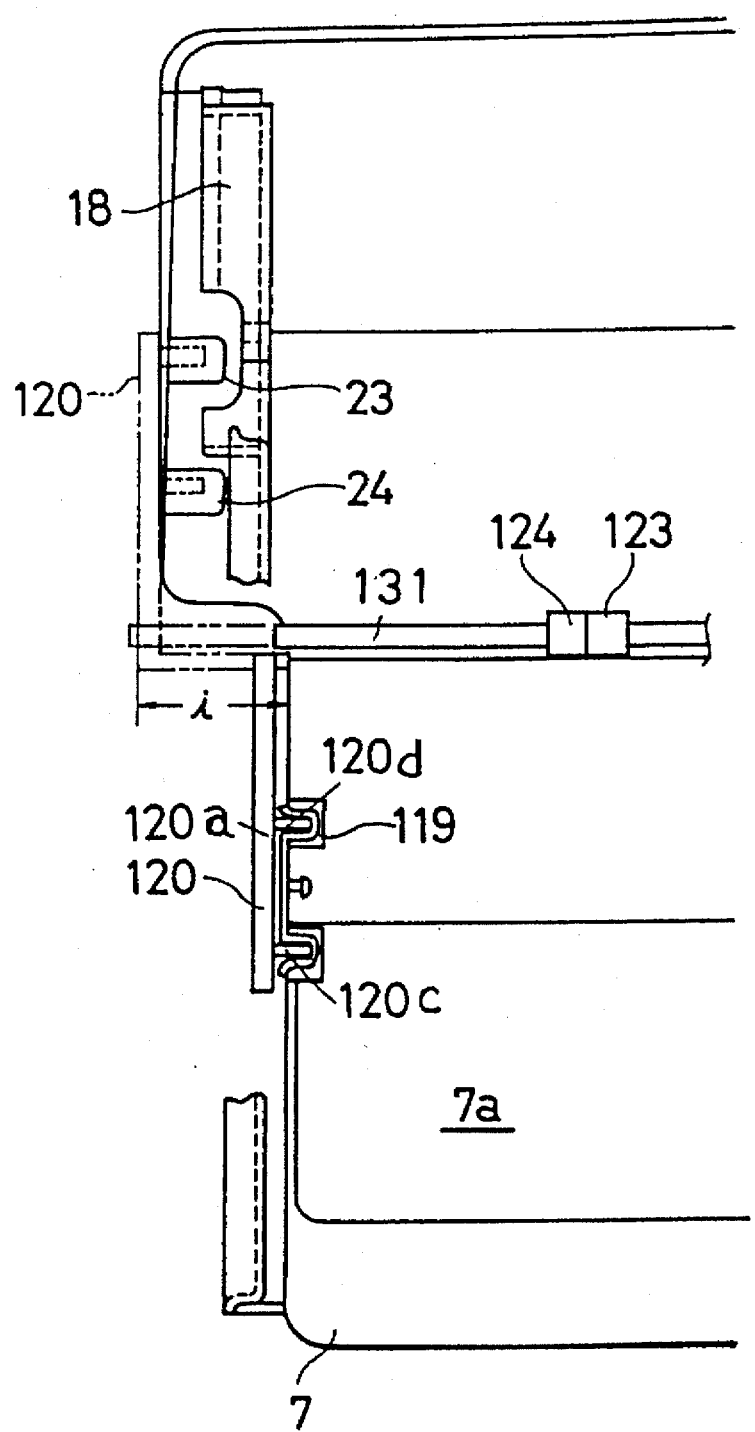
FIG. 15 is a view for describing the operation of the belt guide.

As illustrated in FIGS. 14 and 15, a retaining spring 119 for retaining the pair of belt guides 120 (the details of which will be described later) is fixedly secured to the left and right side walls of the seat-portion body 7 in the vicinity of the other inclined surface of the second recess 14. As depicted in FIG. 16, the retaining spring 119 comprises a resilient member the center of which is provided with a mounting hole 119a. The left and right ends of the spring 119 are provided with retaining portions 119b, 119c which resiliently retain the two projecting portions of the belt guide.

The belt guide 120 is supported on the base portion 8 at a position corresponding to the lowermost part of the second recess 14 so as to be capable of turning and of moving to the left and right. As illustrated in FIG. 17, the belt guide 120 comprises a guide portion 120a for guiding the seat belt 131 of the vehicle, a turning shaft 120b provided on one end of the guide portion 120a and passed through belt-guide through-holes 29, 30 (shown in FIG. 5) of the base portion 8 so as to be capable of turning and of moving axially, and two projecting portions 120c, 120d upstanding from the guide portion 120a. The two projecting portions 120c, 120d are formed respectively to have recesses 120e, 120f engaged by the respective retaining portions 119b, 119c of the retaining spring 119.

Figure 18:
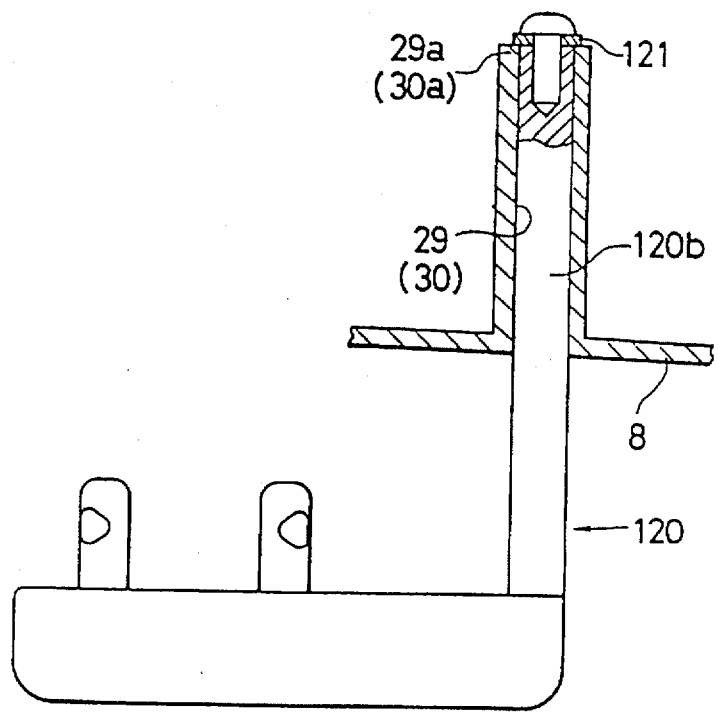
FIG. 18 is a view showing the belt guide in the mounted state.

As indicated by the solid line in FIG. 15, the belt guide 120 ordinarily is set in a state in which it is not used, namely in a state in which it is pushed into the base portion 8 to the maximum extent and retained by the retaining spring 119. For example, in a case where the width of the vehicle seat is fairly large relative to the width of the protective seat 1, the belt guide 120 is pulled out the prescribed amount and turned leftward, as indicated by the two-dot chain line, and the belt guide 120 is set at an in-use position where the projecting portions 120c, 120d fit into the respective grooves 23, 24. With the belt guide 120 in this position, the seat belt of the vehicle is guided from the left by an amount i. Furthermore, as shown in FIG. 18, pull-out of the belt guide 120 is limited owing to the fact that an engaging member 121 secured to the end of the turning shaft 120b comes into abutting contact with a stopper 29a provided at the end portions of the belt-guide through-holes 29, 30.

In the belt guide 120 thus constructed, the belt guide 120 is thrust outward to the left to disengage it from the retaining spring 119, and the belt guide 120 is turned to fit the projecting portions 120c, 120d into the respective grooves 23, 24; 25, 26. As a result, the guide portion 120a of the belt guide 120 assumes a state in which it projects in the lateral direction. By guiding the seat belt 131 of the vehicle over the projecting guide portion 120a, the portion where the tongue 123 and buckle 124 engage is kept away from the corner of the protective seat 1, thereby stabilizing the engagement between the tongue 123 and buckle 124 and greatly improving its reliability.

In this embodiment, the left and right side walls of the seat-portion body 7 are provided with the belt guide 120. However, an arrangement can be adopted in which the belt guide 120 is provided on either of the left and right side walls of the seat-portion body 7.

Figure 20A:
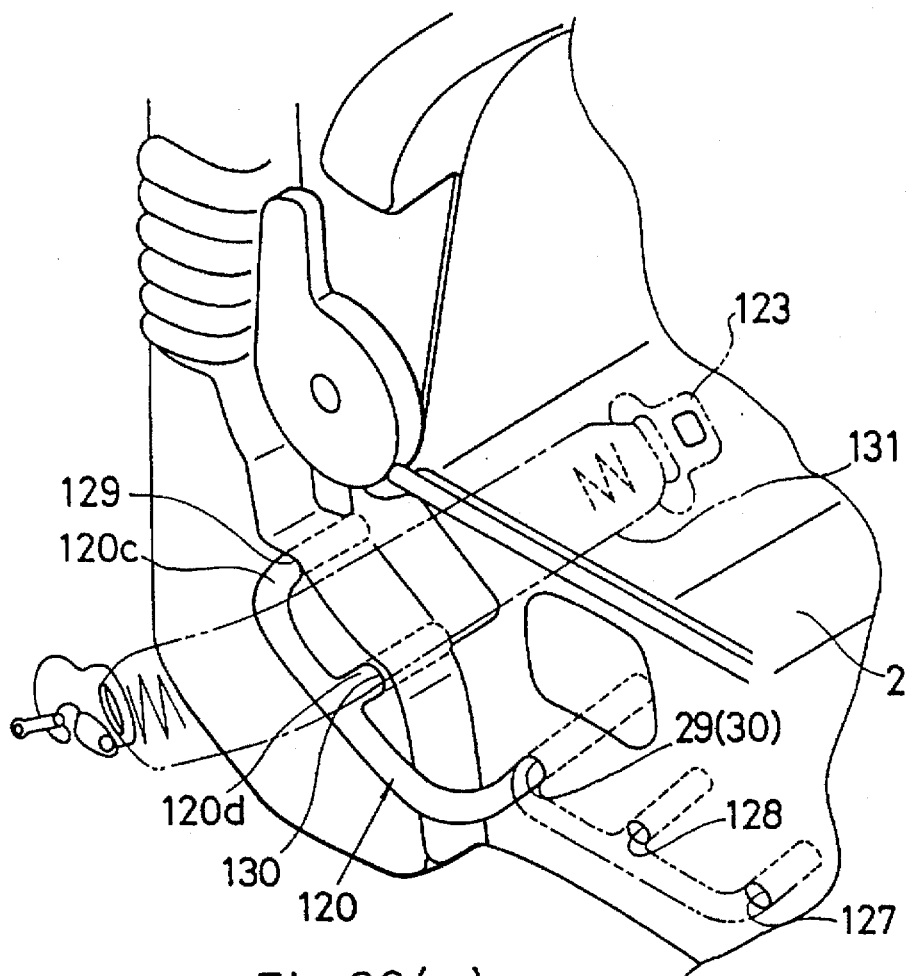
FIG. 20 partially illustrates another embodiment of the present invention, in which (a) is a perspective view and (b) a front view.
Figure 20B:
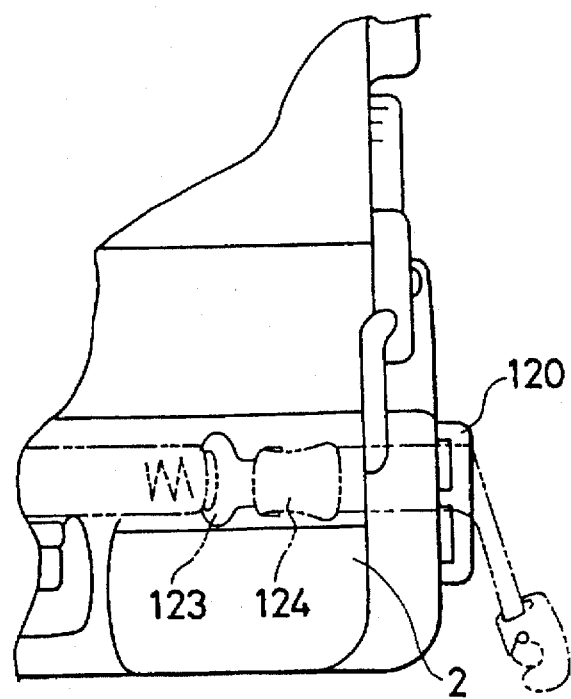

FIG. 20 is a diagram showing another embodiment of the present invention. Identical elements are designated by like reference characters and need not be described in detail again.

In this embodiment, at least the left or right side (the left side in the illustrated embodiment) of the seat-portion body 7 is provided with retaining holes 127, 128, in which the first projection 120c and second projection 120d of the belt guide 120 are fitted, at positions employed when the belt guide 120 is not used, and with retaining holes 129, 130, in which the first projection 120c and second projection 120d of the belt guide 120 are fitted, at positions employed when the belt guide 120 is used. Further, in this embodiment, the amount by which the belt guide 120 is pulled out is limited in the same manner as illustrated in FIG. 18 of the foregoing embodiment.

As indicated by the two-dot chain line in FIG. 20, the belt guide 120 ordinarily is set at the non-use position with the turning shaft 120a pushed into the belt guiding through-holes 29, 30 to the maximum extent and the projections 120c, 120d fitted into the retaining holes 127, 128, respectively. When used, the belt guide 120 is pulled out to the left by the prescribed amount and turned, and the belt guide 120 is set in the in-use position, indicated by the solid line, by fitting the projections 120c, 120d into the retaining holes 120c, 120d, respectively. With the belt guide 120 in this position, the seat belt 131 of the vehicle is guided from the left over the distance i.

Figure 21A:
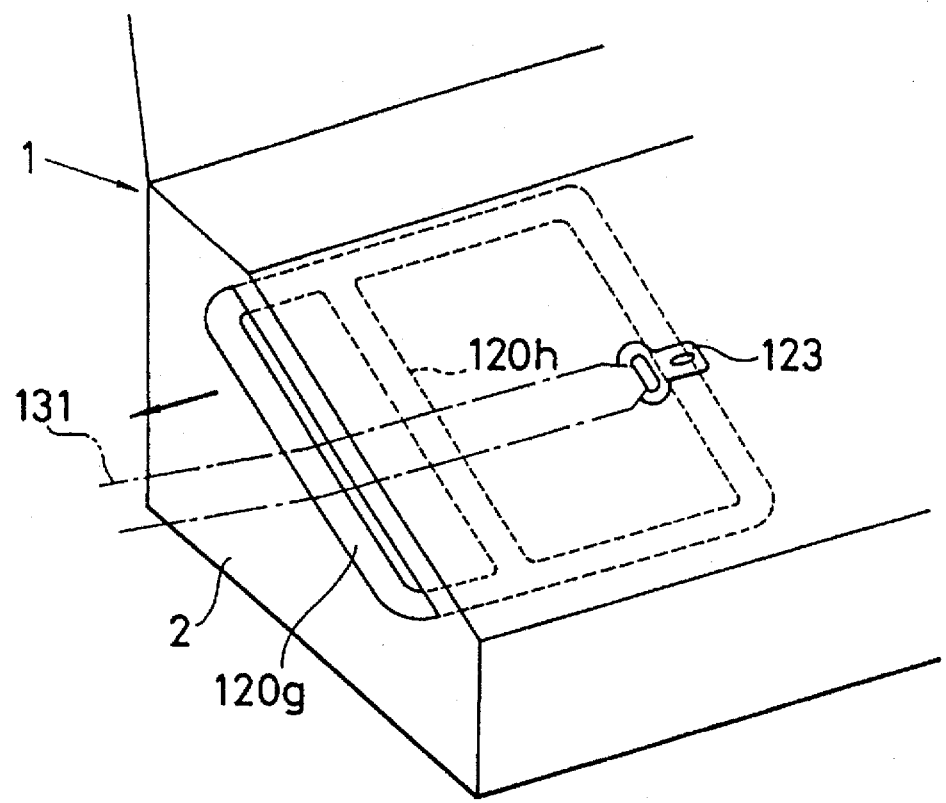
FIG. 21 partially illustrates still another embodiment of the present invention, in which (a) is a perspective view and (b) a sectional view.
Figure 21B:
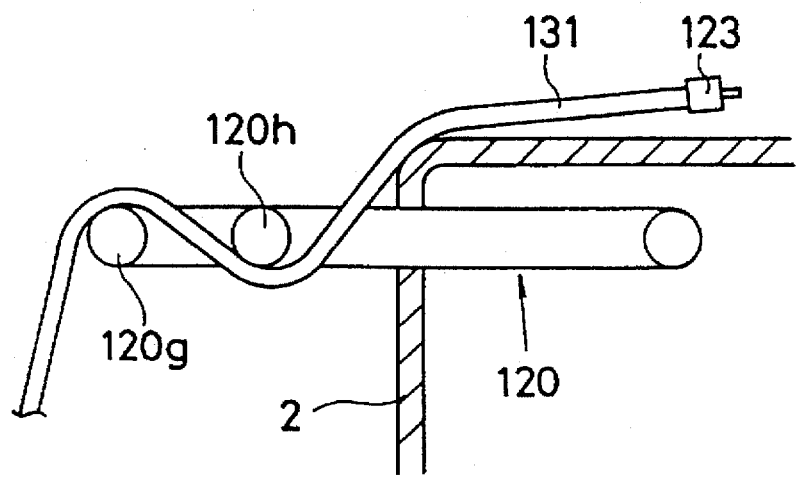

FIG. 21 is a view showing still another embodiment of the present invention.

As illustrated in FIG. 21(a), in this embodiment the belt guide 120 is arranged on the seat portion 2 of the infant-restraining protective seat 1 so as to be capable of being moved back and forth in the lateral direction. The belt guide has a first guide portion 120g and a second guide portion 120h lying parallel to the first guide portion 120g. When the belt guide 120 is in the non-use position, the second guide portion 120h is situated within the seat portion 2. When the belt guide 120 is in the in-use position, the second guide portion 120h assumes a position outside of the interior of the seat portion 2, as indicated in (b) of FIG. 21. In this case, the non-use position and in-use position of the belt guide 120 are provided with supporting means (not shown) for supporting the belt guide 120 at these positions.

With the belt guide 120 in the non-use position, the seat belt 131 is extended toward the side of the buckle (not shown) with almost no effect upon the belt guide 120, and the position at which the tongue 123 and buckle are fastened together approaches the buckle side. With the belt guide 120 in the in-use position, the seat belt 131 engages the upper side of the first guide portion 120g as well as the lower side of the second guide portion 120h and therefore assumes a zig-zag form. As a result, the seat belt 3 is pulled in so that the tongue 123 moves leftward to the side opposite the buckle. Accordingly, the position at which the tongue 123 and buckle are fastened together also moves to the left.

In this embodiment, the belt guide 120 has the first guide portion 120g and the second guide portion 120h at the two locations. However, a guide portion can be provided at one location or at three or more locations. Further, though the seat belt 131 engages the upper and lower sides of the first and second guide portions 120g, 120h, respectively, the seat belt 131 can be placed in a state in which it is wound a suitable number of times about either of the first and second guide portions 120g, 120h.

Furthermore, the amount of projection of the first and second guide portions 120g, 120h outwardly of the seat portion 2 can be adjusted continuously or in stages.

Figure 22A:
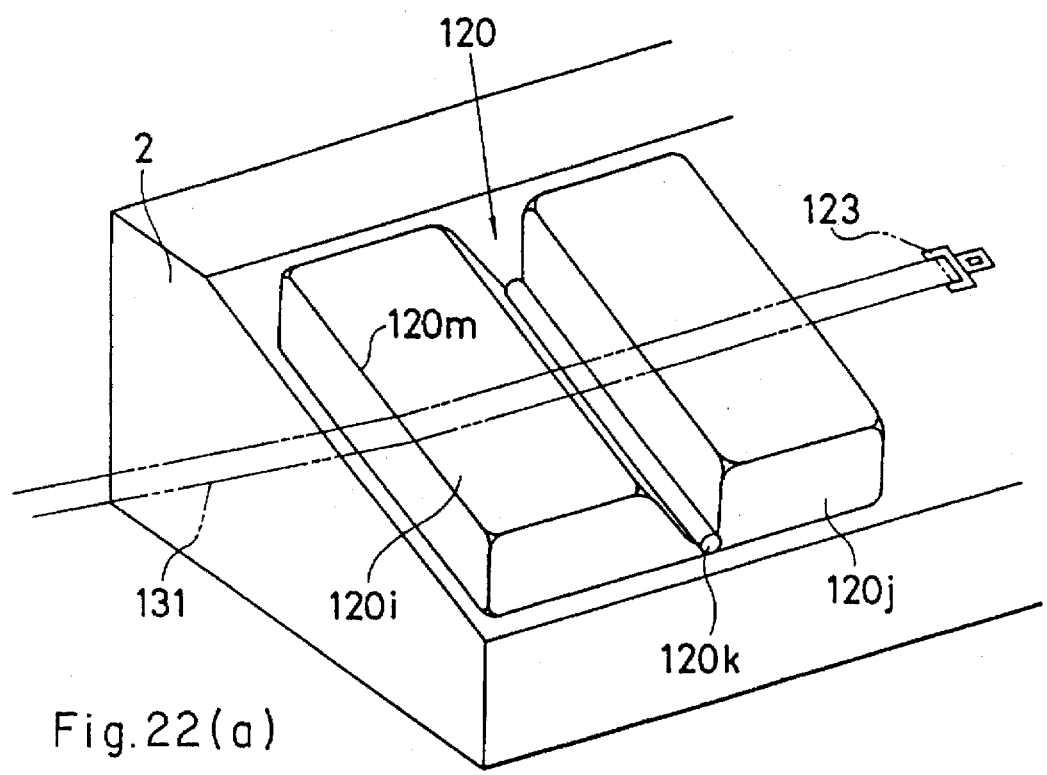
FIG. 22 partially illustrates a further another embodiment of the present invention, in which (a) is a perspective view showing the embodiment not in use and (b) a perspective view showing the embodiment in use.
Figure 22B:
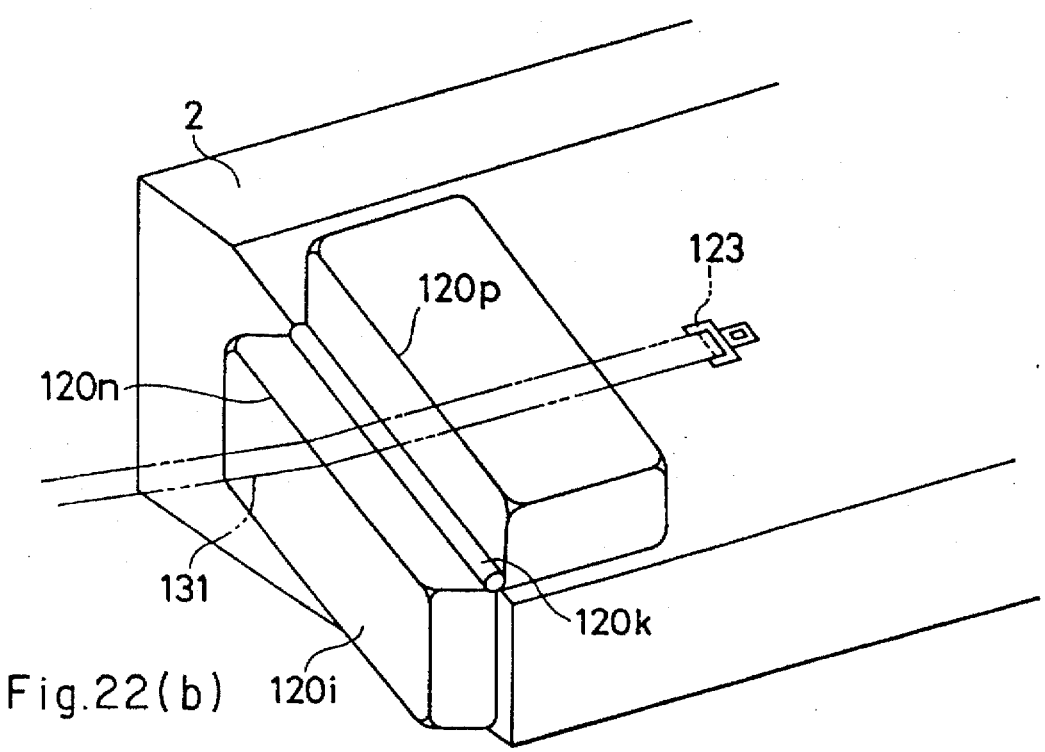
Figure 23A:
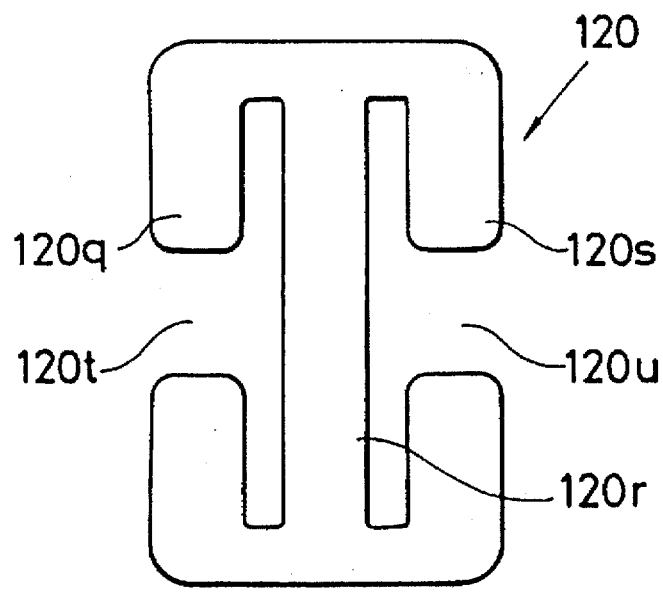
Figure 23B:
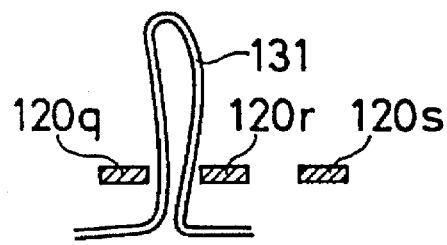
Figure 23C:
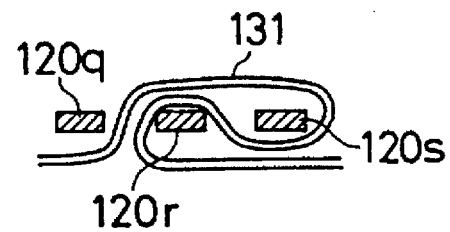
Figure 23D:
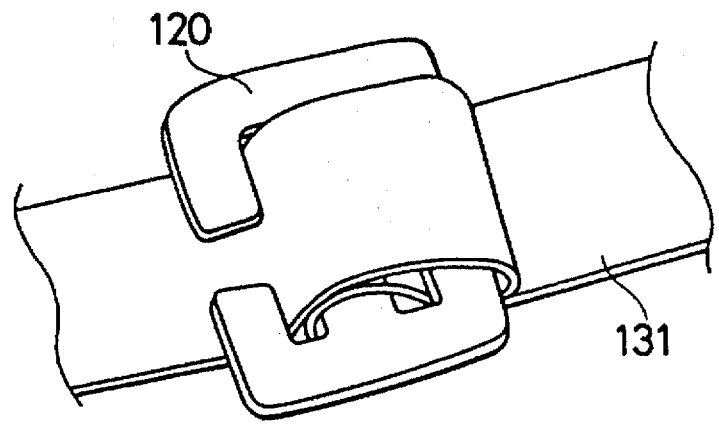

FIG. 22 is a view showing a further embodiment of the present invention.

In this embodiment, as shown in FIG. 22, the belt guide 120 is formed of two blocks 120i, 120j each in the shape of a rectangular parallelepiped, and the blocks 120i, 120j are interconnected, so as to be capable of turning relative to each other, by a rotary shaft 120k such as a hinge. When the belt guide 12 is not in use, as shown in (a) of FIG. 22, the blocks 120i, 120j are placed on the top side of the seat portion 2 at its side so that the seat belt 131 is guided by a corner portion of one of the blocks. When the belt guide 12 is in use, as shown in (b) of FIG. 22, one block 120i is held at the side surface of the seat portion 2 and the other block 120j is placed on the top side of the seat portion 2 so that the belt guide 120 is set in such a manner that the rotary shaft 131 is situated at the corner of the seat portion 2. As a result, the seat belt 131 is moved leftward of the seat portion 2 by an amount equivalent to the thickness of the block 120i. Accordingly, the position at which the tongue 123 and buckle are fastened also is moved leftward.

With the belt guide 120 set at the in-use position and the protective seat 1 secured to the vehicle seat by the seat belt 131, the belt guide 120 is fixed to the seat portion securely by the binding force of the seat belt 131.

It should be noted that damage to the seat belt 131 can be prevented by rounding the corner of the block which guides the seat belt 131, thereby guiding the seat belt 131 more smoothly. When the belt guide 120 is not being used, it can be stored at a separate storage location.

In the foregoing embodiments, a case is described in which the present invention is applied to the infant-restraining protective seat 1 in which the seat back 3 is tiltably attached to the seat portion 2 by the turning shaft 20. However, the present invention is not limited to this arrangement, for the invention is applicable also to an infant-restraining protective seat in which the seat portion 2 and seat back 3 are integrally molded as a unitary body.

In accordance with the apparatus for adjusting the fastening position of the fastening means in the seat belt device according to the present invention, as evident from the foregoing description, the fastening position of the fastening means of the seat belt device can be moved to the left or right. Accordingly, when the fastening means is fastened in order to secure the infant-restraining protective seat to the seat of the vehicle, the fastening means assumes a position offset from the corner of the protective seat. This makes it possible to secure the protective seat to the vehicle seat stably and reliably even if the widths of the protective seat and vehicle seat differ greatly from each other.

As many apparently widely different embodiments of the present invention can be made without departing from the spirit and scope thereof, it is to be understood that the invention is not limited to the specific embodiments thereof except as defined in the appended claims.

What is claimed is:

1. An apparatus including an infant-restraining protective seat for restraining and protecting an infant, said apparatus comprising a belt guide means located under a seat portion of said protective seat for guiding a seat belt device installed in a seat of a vehicle to secure said protective seat to said vehicle, said seat belt device having at least a seat belt and fastening means such as a tongue and buckle, for restraining and protecting a passenger seated in the seat, wherein said belt guide means guides said seat belt device under said seat portion of said infant-restraining protective seat to secure said infant-restraining protective seat, said belt guide means comprising adjusting means for adjusting the position of said fastening means in a longitudinal direction of the seat belt so as to prevent interference contact between said fastening means and a corner of said protective seat when said fastening means is fastened in order to secure said infant-restraining protective seat to said vehicle seat, wherein said adjusting means includes at least one portion which is extendible in a horizontal direction from at least one side wall of said infant-restraining protective seat.

2. The apparatus according to claim 1, wherein said belt guide means guides the seat belt in a horizontal direction.

3. The apparatus according to claim 1, said belt guide means is provided on said infant-restraining protective seat.

4. The apparatus according to any one of claims 1–3; wherein said belt guide means is adjustable between retracted and extended positions.

5. In combination: a seat and an apparatus for adjusting a fastening position of a fastening means in a seat belt device installed in a seat of a vehicle, said seat belt device having at least a seat belt and fastening means such as a tongue and buckle, for restraining and protecting a passenger seated on the seat, wherein said seat belt device is capable of securing an infant-restraining protective seat for restraining and protecting an infant;

said apparatus comprising:

an adjusting means for adjusting the fastening position of said fastening means in a longitudinal direction of the seat belt so as to prevent interference contact between said fastening means and a corner of said protective seat when said fastening means is fastened in order to secure said infant-restraining protective seat to said vehicle seat, wherein said adjusting means includes at least a belt guide for guiding the seat belt in a horizontal direction, said belt guide comprising two blocks each in the shape of a rectangular parallelepiped, said blocks being pivotally connected.

* * * * *